(12) United States Patent
Fisher et al.

(10) Patent No.: US 7,644,391 B2
(45) Date of Patent: Jan. 5, 2010

(54) SIDEBAR ENGINE, OBJECT MODEL AND SCHEMA

(75) Inventors: Oliver Fisher, Ottawa (CA); Paul Erickson, Sammamish, WA (US); Louis Amadio, Sammamish, WA (US); Brian Teutsch, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 924 days.

(21) Appl. No.: 11/206,095

(22) Filed: Aug. 18, 2005

(65) Prior Publication Data

US 2007/0044029 A1  Feb. 22, 2007

(51) Int. Cl.
  *G06F 9/44* (2006.01)
  *G06F 3/00* (2006.01)
(52) U.S. Cl. ............. 717/109; 717/104; 717/105; 717/115; 719/320; 719/318; 719/328; 719/329
(58) Field of Classification Search ......... 717/104–105, 717/115; 715/762–763, 779
See application file for complete search history.

(56) References Cited

U.S. PATENT DOCUMENTS

| | | | |
|---|---|---|---|
| 5,129,052 A | 7/1992 | Barker et al. | |
| 5,146,556 A | 9/1992 | Hullot et al. | |
| 5,819,055 A | 10/1998 | MacLean et al. | |
| 5,937,417 A | 8/1999 | Nielsen | |
| 6,029,175 A | 2/2000 | Chow et al. | |
| 6,031,530 A | 2/2000 | Trueblood | |
| 6,259,461 B1 | 7/2001 | Brown | |
| 6,282,547 B1 | 8/2001 | Hirsch | |
| 6,311,221 B1 | 10/2001 | Raz et al. | |
| 6,411,311 B1 | 6/2002 | Rich et al. | |
| 6,693,652 B1 | 2/2004 | Barrus et al. | |
| 6,717,593 B1 * | 4/2004 | Jennings | 715/760 |
| 7,277,912 B2 | 10/2007 | Corboy et al. | |
| 7,325,204 B2 | 1/2008 | Rogers | |
| 2002/0080170 A1 | 6/2002 | Goldberg et al. | |

(Continued)

OTHER PUBLICATIONS

Snippets Product Overview. Downloaded from www.snippets.com Jun. 11, 2001.

(Continued)

*Primary Examiner*—Lewis A Bullock, Jr.
*Assistant Examiner*—Carina Yun
(74) *Attorney, Agent, or Firm*—Senniger Powers LLP

(57) ABSTRACT

An engine is provided for displaying an application for hosting a second application. The hosting application can be a sidebar on a display. The engine can contain a part or program which can include a manifest file, a definition file and/or a script file. The manifest file may contain a pointer to at least one of the definition file and the script file. The engine may also contain a loader that can locate the definition file and/or script file (e.g., via pointers in the manifest file) and load the definition file and/or script files of the part for processing. The engine may also execute script associated with the part and convert an object model into a user interface which can be displayed at a predetermined location on a display or docked onto a sidebar. The user interface can further be manipulated or relocated within the sidebar or removed (i.e., undocked) from the sidebar. The sidebar may be exploded or imploded with the corresponding parts on the sidebar displayed on the desktop or another application (exploded) or returned to the sidebar (imploded).

17 Claims, 13 Drawing Sheets

U.S. PATENT DOCUMENTS

| | | | |
|---|---|---|---|
| 2002/0135621 A1 | 9/2002 | Angiulo et al. | |
| 2002/0144014 A1 | 10/2002 | West | |
| 2002/0161837 A1 | 10/2002 | Sasaki et al. | |
| 2003/0058286 A1 | 3/2003 | Dando | |
| 2003/0120731 A1* | 6/2003 | Weinberg et al. | 709/205 |
| 2003/0189597 A1 | 10/2003 | Anderson et al. | |
| 2004/0003096 A1* | 1/2004 | Willis | 709/228 |
| 2004/0056894 A1* | 3/2004 | Zaika et al. | 345/762 |
| 2005/0044491 A1* | 2/2005 | Peterson | 715/517 |
| 2005/0251753 A1* | 11/2005 | Sawyer | 715/765 |
| 2006/0015818 A1* | 1/2006 | Chaudhri et al. | 715/779 |

OTHER PUBLICATIONS

Printout of representative pages from www.snippets.com website: Jun. 11, 2001.

Printout of representative pages from www.infogate.com website: Jun. 11, 2001.

The Octopus Platform. Downloaded from www.octopus.com Jun. 11, 2001.

Multiplying enterprise Application ROI, An Octopus Whitepaper. Apr. 2001, Downloaded from www.octopus.com Jun. 11, 2001.

Printout of representative pages from www.dodots.com website: Jun. 11, 2001.

Printout of representative pages from www.enfish.com website: Jun. 11, 2001.

S. Parsowith, et al. "Tickertape: Notification and Communication in a Single Line". Publication date unknown.

N. Marmasse. "Commotion: a context-aware communication system". In Proceedings of CHI, 1999.

S. Greenberg and M. Rounding, "The Notification Collage: Posting Information to Public and Personal displays", Yellow Series Report 2000-667-19, Department of Computer Science, University of Calgary, Alberta, Canada. Publication date unknown.

BotKnowledge, "InfoGate Review", 2000. "www.botknowledge.com/infogatereview.html", 1 page.

Konfabulator, Version 2.1.1., Aug. 3, 2005 at www.konfabulator.com, downloaded Nov. 15, 2005.

Corporate Portals Letter, vol. 1, No. 10, Oct. 2000, 3 pages.

Delaney, Kevin J., (Wall Street Journal) Google Helps Clients Get Personal, Aug. 22, 2005, 1-3 Pages.

Google debuts,, Google Gadgets, May 10, 2006, 1-2 pages.

Google, Sidebar to Launch Monday Aug. 21, 2005, 1-8 pages.

Ziff Davis Media Inc., Apple Previews Mac OSX "Tiger", Jun. 28, 2004, 8 pages.

Ziff Davis Media Inc., Mac 'widget' App Set to Make Windows Debut, Nov. 8, 2004, 1-4 pages.

* cited by examiner

```xml
<?xml version ="1.0" encoding="utf-8" ?>
<view>
    <image id="main" Source="Images\Default\Bezel.png" Stretch="both" Height="130" Width="130" />
    <image id="Highlight" Source="Images\Default\Highlight.png" Stretch="both" Height="130" Width="130" />
    <image id="Second" CenterX="65" CenterY="65" Source="Images\Default\SecondHand.png" Stretch="both" Height="130" Width="130" />
    <image id="Min" CenterX="65" CenterY="65" Source="Images\Default\MinHand.png" Stretch="both" Height="130" Width="130" />
    <image id="Hour" CenterX="65" CenterY="65" Source="Images\Default\HourHand.png" Stretch="both" Height="130" Width="130" />
    <image id="TickMarks" Source="Images\Default\TickMarks.png" Stretch="both" Height="130" Width="130" />
    <image id="Face" CenterX="65" CenterY="65" Stretch="both" Height="130" Width="130" />
    </image>
</View>
```

FIG. 3

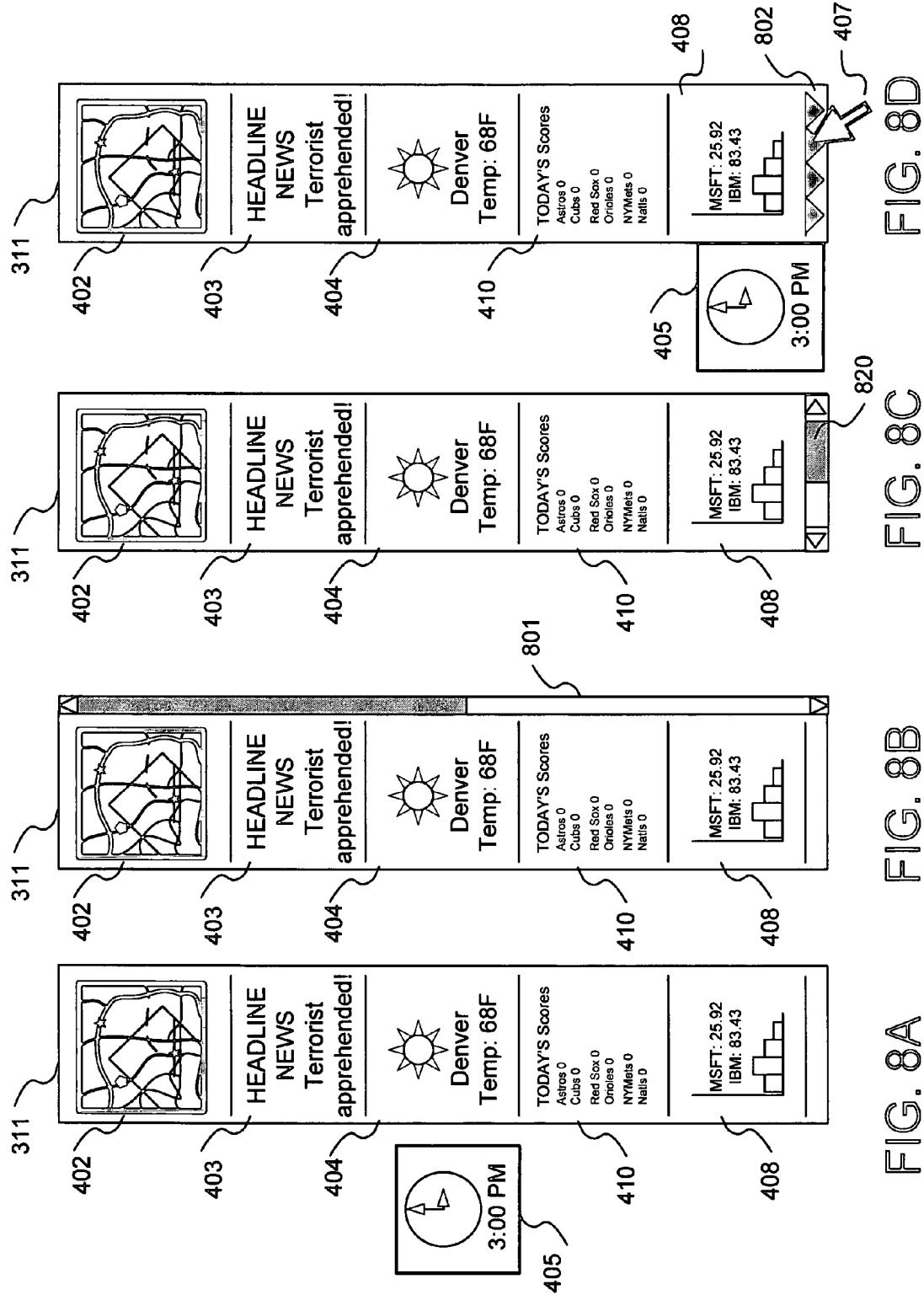

SIDEBAR ENGINE, OBJECT MODEL AND SCHEMA

BACKGROUND

With the current explosion of information available to a computer user, it has become increasingly difficult to keep the information organized and available to the user. This is particularly true when the user also uses the computer to obtain information and to accomplish other computer tasks at the same time. For example, a user may wish to write a document in a word processing application or a spreadsheet application but may also wish to receive information simultaneously. If a user is working in the word processing application, for example, the application window of the word processing program obscures other applications that may be displayed on the display. This impedes access to the other information that might have been displayed on the display. As a result, the user loses access to the desired information.

This problem is heightened when the information sought is dynamic information that might be subject to frequent changes. Some examples of such information include weather conditions in any of a variety of locations, obtaining the time, sports scores, breaking news events, stock quotes, traffic information, or mass transit status updates, to name a few. For example, a user may be working in a word processing application but still may wish to receive continuous updates on traffic conditions, particularly if the user plans to go out on the roads in the near future. However, the displayed word processing application window may cover the traffic information on the display making the traffic information inaccessible to the user. As such, the user cannot make his travel plans ahead of time without first having to either close and open windows or at least rearrange windows on the desktop. This would be a time-consuming task for the user.

In addition, there is a limited amount of space on the display such that with multiple types of desired information, screen space would rapidly become depleted. The window of an application that the user is currently using would very likely obscure at least some of the application windows providing the desired information. For example, a user may wish to receive traffic updates, stock quote information on selected securities, and weather information. However, while working in a word processing application, for example, the desired traffic, stock and weather information would be obscured behind the active window. Thus, the user would not be apprised of the latest traffic or weather information and would be unprepared for the conditions outside or on the road. Likewise, the user would not be apprised of the price of his selected securities or other requested information. This might lead to losses in his stock portfolio, among other things.

Therefore, there exists a need in the art for a system and method for hosting, docking and/or undocking applications on another application to present information to a user. There is also a need to provide docking and undocking of applications in a easy-to-use and user-friendly manner.

SUMMARY

The system and method enables the display of content of an application within the display of another application, docking and undocking of an application in another application.

In one aspect, a representation of a part or program can be displayed on a computer display. The representation can also be displayed on a sidebar, docked to the sidebar, undocked from the sidebar, or arranged/re-arranged on the sidebar.

In another aspect, a system is provided containing a part or program, the part or program can contain a file containing pointers to other files associated with the part or program and other files containing code or script associated with the part. The system can further include an engine for locating files associated with the part or program, loading the located files and executing the files.

In another aspect, a display element is provided that can host the representation of the part or program. Selection of the part or program in the display element can cause the part or program to be docked onto a second application program display. The second application can be a sidebar.

In another aspect, a computer-readable medium is provided with computer-executable code stored thereon for providing a representation of a user interface on a display.

BRIEF DESCRIPTION OF THE DRAWINGS

FIG. 3 illustrates an example of a definition file.

FIGS. 8A-8D illustrates examples of management of overflow of parts on a sidebar.

DETAILED DESCRIPTION

Figure 1:
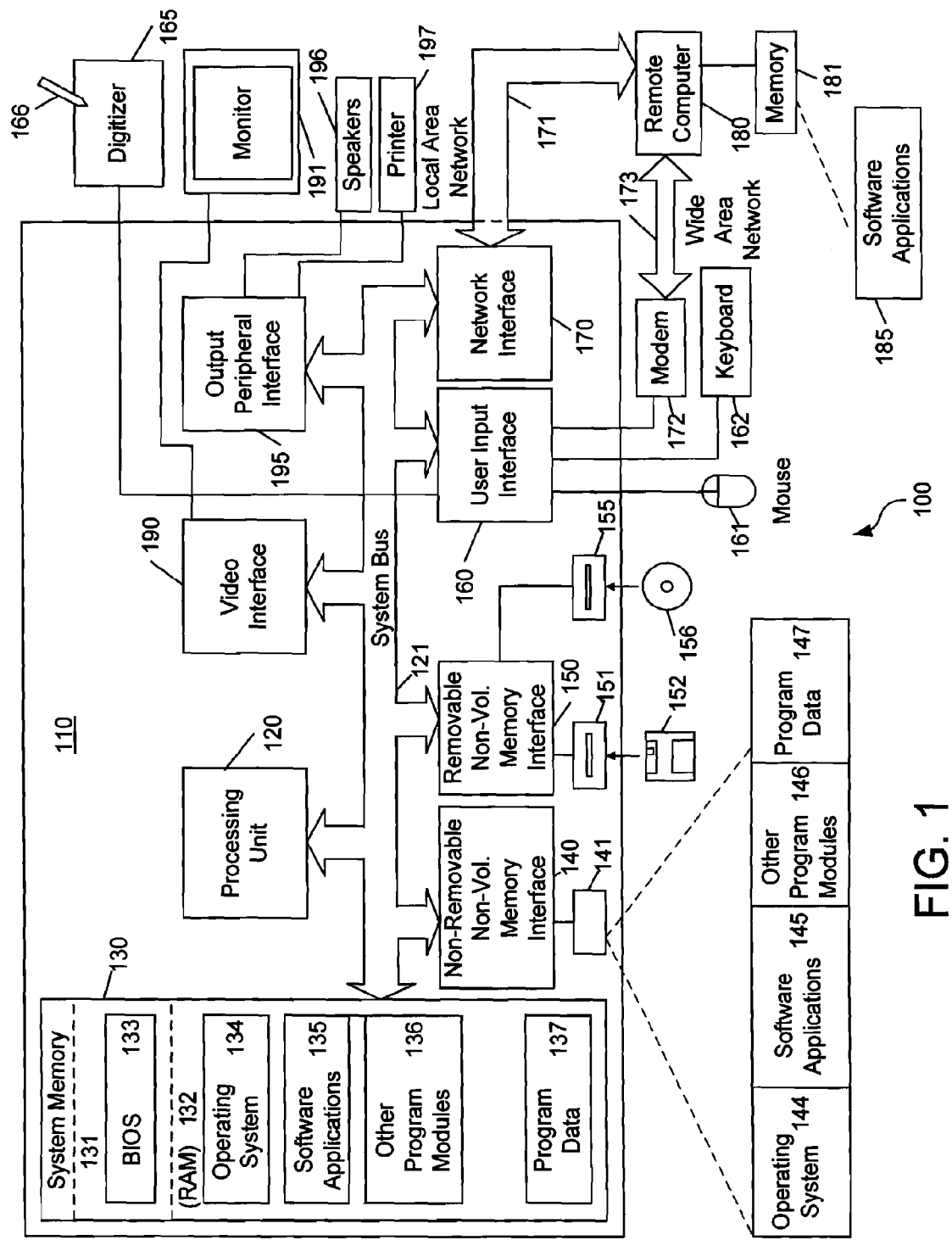
FIG. 1 illustrates an example of a system for implementing the invention which includes a general purpose computing device in the form of a computer.

The examples may be implemented in an operating environment. FIG. 1 illustrates an example of a suitable operating environment 100 in which aspects may be implemented. The operating environment 100 is only one example of a suitable operating environment and is not intended to suggest any limitation as to the scope of use or functionality. Other well known computing systems, environments, and/or configurations that may be suitable include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

FIG. 1 illustrates an example of a suitable computing system environment 100 for implementation. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 1, an illustrative system includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media includes both volatile and nonvolatile media, removable and non-removable media. By way of example, and not limitation, computer readable media may comprise computer storage media and communication media and includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162, a digitizer tablet 165 with a digitizer pen 166, and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

It will be appreciated that the network connections shown are exemplary and other means of establishing a communications link between the computers may be used.

In one example, a computer application is provided for providing desired data. The application may be provided in a remote execution environment. Examples of such a remote execution environment may include but are not limited to a web browser, a Terminal Services Desktop or a Virtual PC Desktop. The application can display a window, icon, or other display element on a computer display in which information can be presented. For example, the application may display a small window on a display containing any type of desired information. Such information can include, for example, traffic information, weather information, news events, sports scores, time of day in different time zones, etc. These applications may be any type of data file such as but not limited to a ZIP file or CAB file, and are sometimes referred to as "parts," widgets, or gadgets, which are described in more detail herein.

A user can dock a part (widget or gadget) to an application to display the part at a predetermined location on a computer display. Many computer applications can be used to dock a part. For example, a part can be docked to an application window of a computer application (e.g., a sidebar). The application window of a sidebar application can encompass, for example, a vertical rectangular area along a side of the computer display (e.g., the right side). However, the application window can be of any shape or configuration and can be located at any desired location on the computer display. A part that is docked on a sidebar can also be removed or undocked from the sidebar. Also, multiple instances of one part may be displayed in the sidebar (e.g., a weather part displayed in multiple instances, each instance corresponding to the weather in a particular location).

Figure 2A:
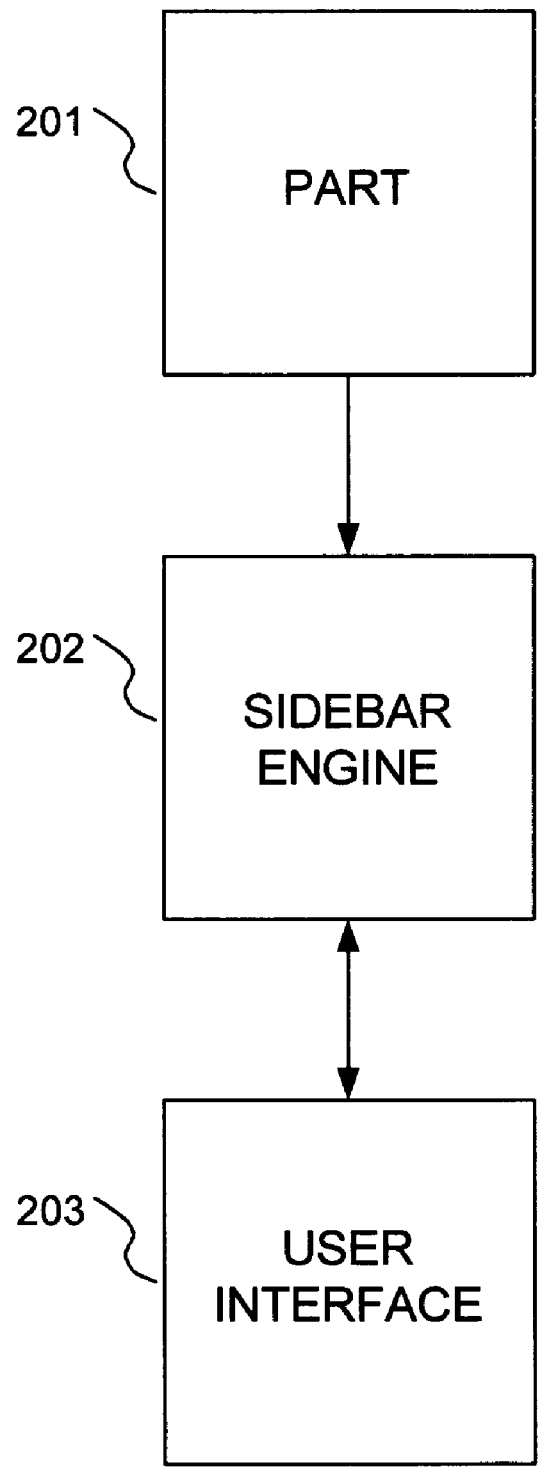
FIGS. 2A-2B are block diagrams illustrating components of a part, sidebar and user interface and schema for management of parts.

FIG. 2 is a block diagram illustrating the part with the sidebar and user interface (UI). The part 201 communicates information to a sidebar engine 202 which also exchanges information with a User Interface (UI) 203. Through these interactions, a part can be displayed at a desired location on a display or in conjunction with other parts on a display. Parts can also be docked to a sidebar or undocked from the sidebar.

Figure 2B:
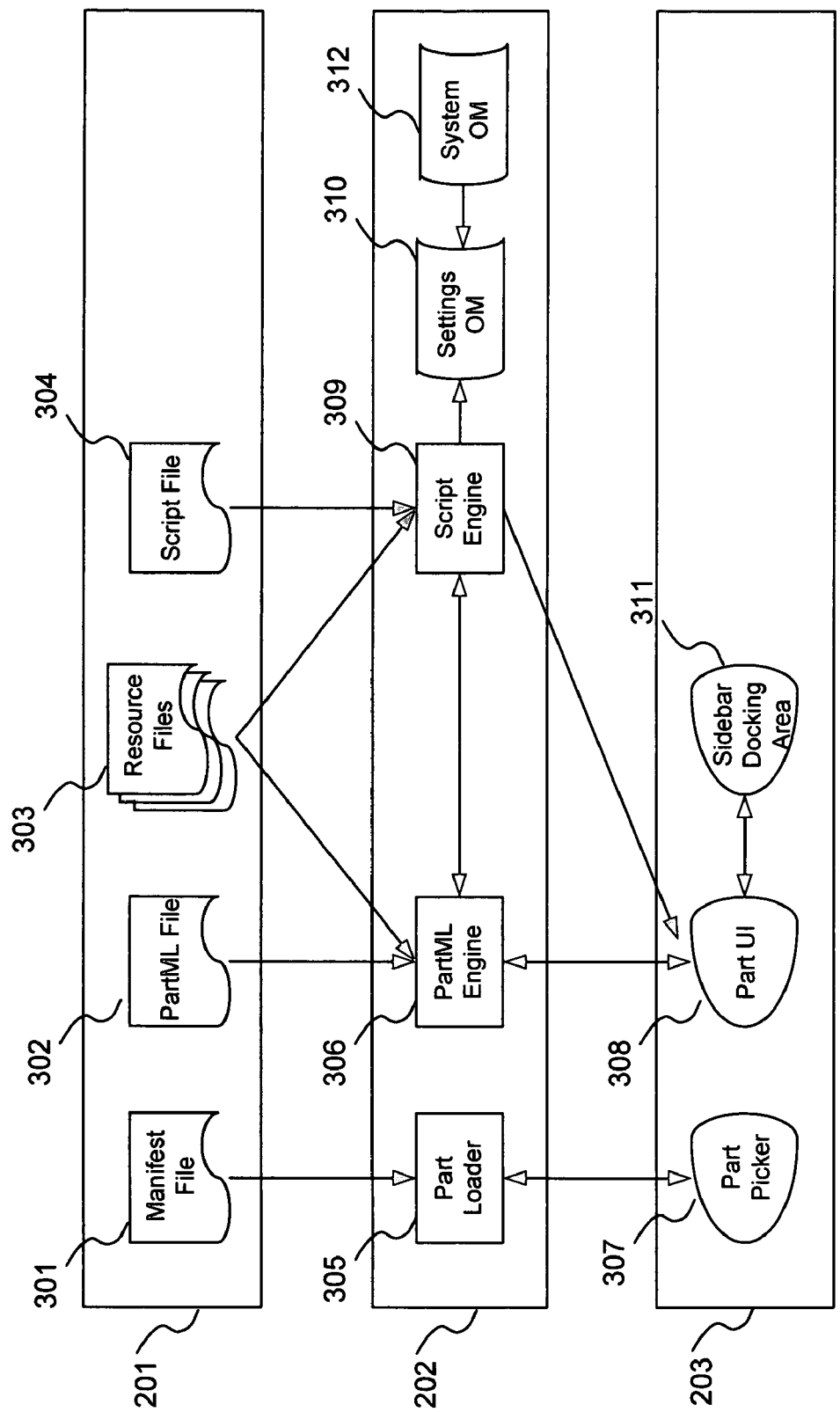

FIG. 2B illustrates an example of one suitable schema in which one or more illustrative aspects may be implemented. Although one particular design is provided, functional blocks provided here may be combined, rearranged, separated, or even skipped.

As FIG. 2B illustrates, the part 201 can include a file such as a pointer file that lists the contents of other files that comprise the part. As one example of a pointer file, the pointer file containing such information may be a manifest file 301. The manifest file can also include other information as it pertains to the part. For example, the manifest file 301 may contain meta information that describes the part (e.g., name or title of the part). The manifest file 301 can also include pointers to other files in the part.

The part 201 may further include a file that contains the script for the part and a definition file that contains computer code that represents a user interface (UI). In this example, the script for the part 201 can be contained in a script file 304 and the computer code (e.g., XML) that represents or codes the UI can be contained in a definition file such as, for example, a PartML (XML) file 302.

The definition file can take many forms. One example of a representative definition is illustrated in FIG. 3. Merely to illustrate an example of a definition file, a PartML file is illustrated that corresponds to a clock UI containing a second hand, minute hand and hour hand. The example of FIG. 3 is merely to illustrate an example of a definition file and is not intended to limit the contents of definition files.

The part 201 may further include additional resource files 303 for the part. These additional resource files 303 may include, for example, image files and/or sound files for the part 201, or text or data files.

A loader component module, for example a part loader 305, can process and display the part 201 on a computer display. In this example, the loader component module (e.g., a part loader 305) is provided that can load the part 201 via a loading process. In the loading process of the part 201, the part loader 305 may have a pointer to indicate a file path of a file or directory. If a directory is indicated to the part loader 305, the part loader 305 searches within the indicated directory for the pointer file (e.g., manifest file 301) which may itself contain pointers to other files. The part loader 305 finds the relevant pointers within the manifest file 301 and follows those pointers to locate specific files within the part 201. The part loader 305 can send the specific files that it locates after following the pointers in the manifest file 301 to other components in the engine to designated locations depending on the nature of the specific files as described herein. In one example, the part loader 305 may locate definition files (e.g., PartML files 302) from the part 201 and send the PartML files 302 to a program parser module such as but not limited to a PartML engine 306. The part loader 305 may also locate script data files (e.g., script files 304) in the part 201 and send these script data files (e.g., script files 304) to a script engine module (e.g., script engine 309). Any number of script files 304 and/or PartML files 306 (including none of them) may be located and sent to the respective engine modules (e.g., PartML engine 306 or script engine 309) by the part loader 305.

As described, the definition file, such as but not limited to PartML files 302 can describe a UI. The part loader 305 locates relevant PartML files 302 in the part 201 and passes the located, relevant PartML files 302 to the program parser module (e.g., PartML engine 306), which parses the syntax of the PartML files 302. The program parser module (e.g., PartML Engine 306) thus creates a representation of a PartML Object Model (OM) corresponding to or described by the PartML files 302, for example, XML to be received in the PartML Engine 306. The PartML Engine 306 can then convert the representation into a desired UI and draw the UI on the display. The PartML Engine 306 may further inject the PartML OM into the Script Engine 309 in a "hook-up phase", described in more detail below.

In passing script data files (e.g., script files 304) located in the part 201 to a script engine module (e.g., the script engine 309), the part loader 305 streams the text of the script files 304 to the script engine module (e.g., script engine 309). The script engine 309 parses the script files 304 and runs the script which causes an action or desired event to occur. In addition, a System OM 312 and Settings OM 310 may be provided for providing procedures or routines that may be executed corresponding to an object (i.e., methods). Such methods may be embodied on a computer-readable format, for example. Further, the System OM 312 may also contain information pertaining to characteristics or other attributes of an object or representation (i.e., properties). Properties may also be embodied on a computer-readable format. Such methods and/or properties may be used to provide representations of objects on a display and the ability to perform functions with the displayed object.

A Settings OM 310 may also be provided as a component of the System OM 312, for example, and for storing an instance of the files associated with the part 201, such as the manifest file 301, script files 304, PartML Files 302, etc. The files associated with the part 201 can also be referred to as the "part package." There can be multiple instances of the same part 201 running on a machine at any given time. For example, if a part for providing the time of day is displayed as one instance in a sidebar on a display, the same part for providing the time of day may be displayed as a second instance in the sidebar to provide the time in a different time zone, for example. The respective settings for each instance of the part for the clock can be stored in the Settings OM 310. The settings may further be given a name and name-value pairs can be stored in the Settings OM 310 for easy reference of the settings.

In an example of one phase of processing the part, the PartML engine 306 injects the PartML OM into the Script Engine 309 and also injects the System OM 312 into the Script Engine 309. This phase can be termed the "hook-up phase." The functions and methods of the System OM 312, which can be called by the Script Engine 309 or C++ code and the PartML OM are both injected into the Script Engine 309 which can execute script. The instructions within the script file 304 can be "hooked up" to the PartML OM file or plurality of PartML OM in a designated configuration such that when an event is performed, the PartML OM can fire the event such that the Script File 304 can be executed to accomplish the event. Thus, in the hook-up phase, the part 201 permits the corresponding UI to be hooked up with logic (script) which, in turn, permits the UI to be hooked up to the computer system.

The User Interface (UI) 203 corresponding to the part 201 can be displayed on a display. In one example, the UI 203 may include a part UI 308, a part picker 307, and a sidebar docking area 311 as illustrated in FIG. 2B and described herein.

A Part UI 308 is defined by the PartML file 302 and may contain a set of UIs that can be drawn on a display corresponding to the part 201. The Part UI 308 can take any number of appearances. In one example, the Part UI 308 appears on a display as a window that can be moved around to any desired location on the display. An author can specify characteristics of the Part UI 301. Alternatively, at least a portion of the Part UI 308 can be defined by the system such that the author dos not alter certain characteristics of the Part UI 308. Reserving certain standard aspects of the Part UI 308 such that an author does not alter the standard aspects may be useful in providing certain portions of the UI that are necessary or preferred. One example of a Part UI 308 that would be preferably present is a button or other icon for closing the Part UI 308. If a user wishes to close a window for any reason such as to free up space on the display for other work or because the window is no longer in use, the user would likely wish to have a means for removing the window from the display. Also, it would be helpful if the means for removing the window from the display is a standard display element such that the user can easily recognize the display element as the means for removing the window. Hence, a standard "close box" may be provided with the Part UI 308 so that the user can easily recognize the close box and can select the close box to close the window. However, if the author were permitted to freely control the characteristics of the close box associated with a Part UI 308, then the author could remove the close box entirely. In that case, the Part UI 308 would be unremovable by the user.

As another example, a window border may be a predetermined aspect of the Part UI 308 of the part 201. The window border area of an application window or a UI is often referred to as "chrome". The chrome offers users a standard appearance of an application window so that application windows can be easily recognized by all users. Therefore, an author's control of the chrome may be limited so that the chrome is not changed excessively.

The UI 203 may further include a sidebar docking area 311. The sidebar docking area 311 can have a variety of appearances. For example, the sidebar docking area 311 may appear as a rectangular, circumscribed area along a side of a display. A part can be moved to the sidebar docking area 311 on the display and docked to the sidebar docking area 311. Multiple parts may be docked in the sidebar docking area 311 at the same time and may also be arranged within the sidebar docking area 311. Also, any part docked in the sidebar docking area 311 may be removed (i.e., "undocked") from the sidebar docking area 311.

In another aspect, the UI 203 may also include a part picker 307. Using a part picker 307, a user may select a desired part to display from a list of available parts in an interface. The parts may be further displayed in a predetermined area of the display anywhere on the display such as in a sidebar. In one embodiment, the sidebar is a vertically oriented area along the right side of the display.

Figure 4A:
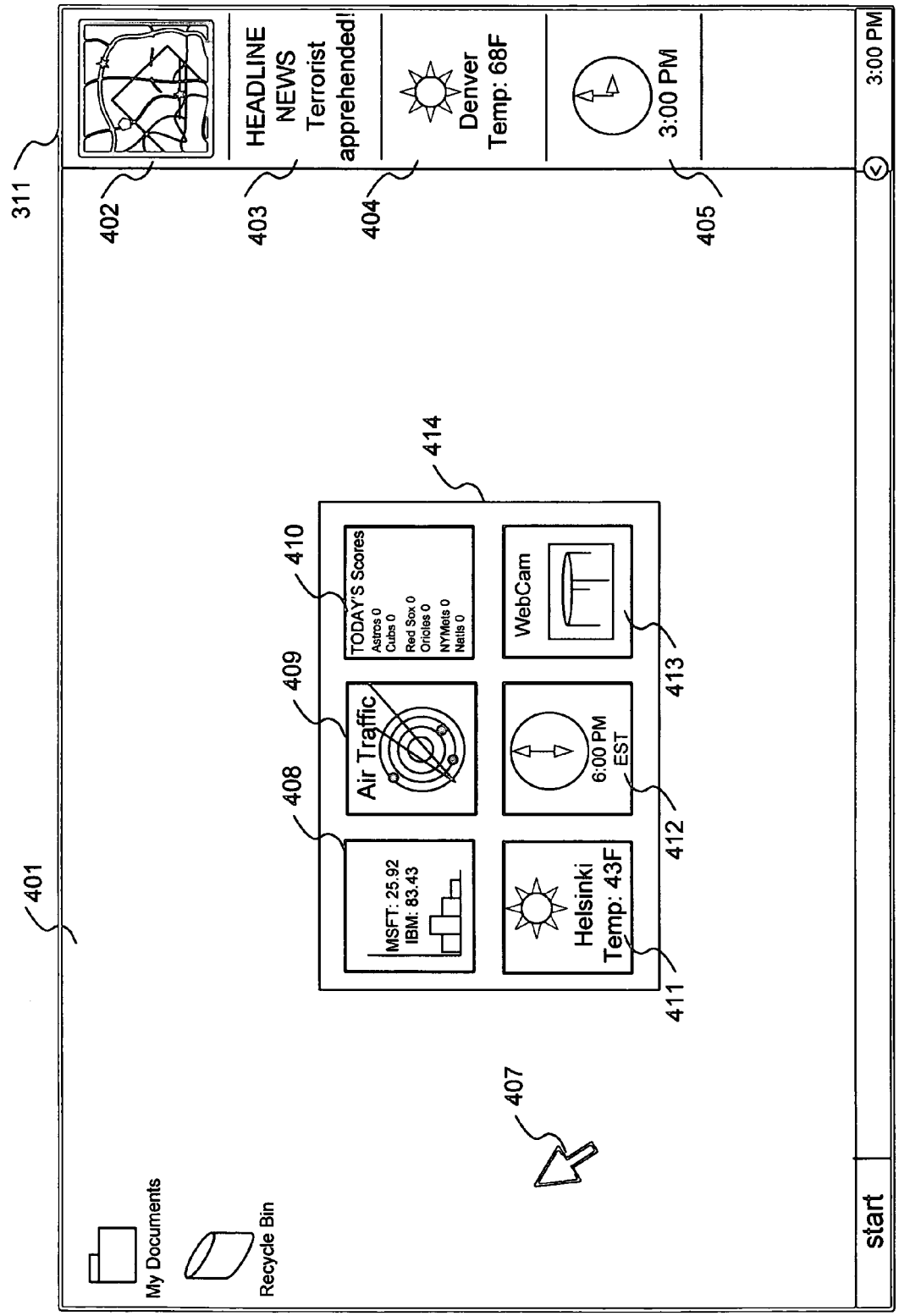
FIG. 4A illustrates an example of a user interface for displaying a list of parts for display.

FIG. 4A illustrates an example of a user interface for displaying a list of available parts from which a user may select desired parts for display. This user interface can be termed a "part picker" 414. In this example, the part picker 414 is displayed on a computer desktop 401 and displays an organization of parts for selection. As FIG. 4A illustrates, the part picker 414 in this example contains a stock quote part 408 (for providing stock quote information), an air traffic part 409 (for providing information on air traffic conditions), sports scores part 410 (for providing the latest sports results as well as on-going results), weather part 411 (for providing information on weather conditions in any desired location), time part 412 (for providing the time in any desired time zone) and a webcam part 413 (for providing images of a desired subject matter). Although illustrated here as a rectangle, the part picker 414 can be any shape or configuration. The part picker 414 may also be located anywhere on the display according to a user's preference. In one example, the part picker 414 is transparent or semi-transparent.

From the part picker 414, a user can select desired parts to be displayed in a persisted location, such as in a sidebar docking area 311. FIG. 4A illustrates a display of the sidebar docking area 311 as a rectangular, circumscribed area along the right vertical side of a display but the sidebar docking area 311 may be displayed anywhere on the display and in any configuration. Parts (408, 409, 410, 411, 412, and/or 413) may be selected from the part picker 414 to be docked or displayed in the sidebar application display 406 in a variety of ways and the examples provided herein are not intended to be limiting to any specific method. For example, a user may select a part from the part picker 414 with a cursor 407, drag the desired part to another location, and drop the part at the other location. Alternatively, a user can select a desired part from the part picker 414 by, for example, clicking on the desired part, causing the desired part to be inserted or docked at another location, such as in the sidebar application display 406.

As FIG. 4A illustrates, parts can be docked on a separate location on the computer display 401 such as in the sidebar docking area 311. The sidebar docking area 311 is illustrated in FIG. 4A as a vertically oriented rectangular region on the right side of a display 401. However, a sidebar docking area can have any shape or configuration. FIG. 4A also illustrates parts that are docked on the sidebar docking area 311. In this example, the sidebar docking area 311 contains a traffic part 402, a news part 403, a weather part 404 and a time part 405.

The traffic part 402 provides information on traffic and road conditions in an area of interest, the news part 403 provides late-breaking news. The weather part 404 provides weather information in an area or city of interest. The time part 405 provides the time in any desired time zone. Any of these parts (402-405) illustrated in FIG. 4A provides up-to-the-minute information that can be updated as the information changes.

Figure 4B:
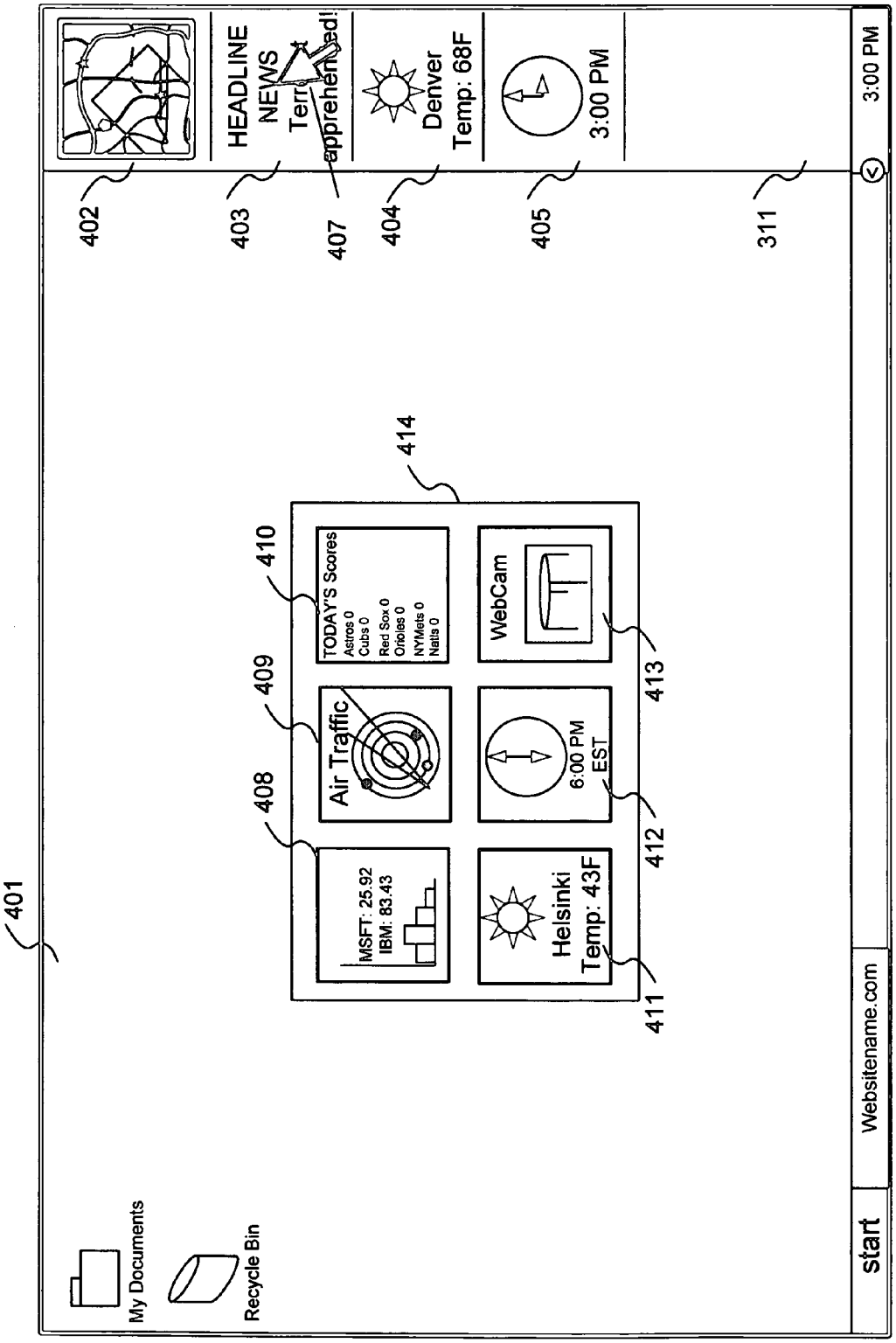
FIGS. 4B-4C illustrate an example of undocking a part from a sidebar.
Figure 4C:
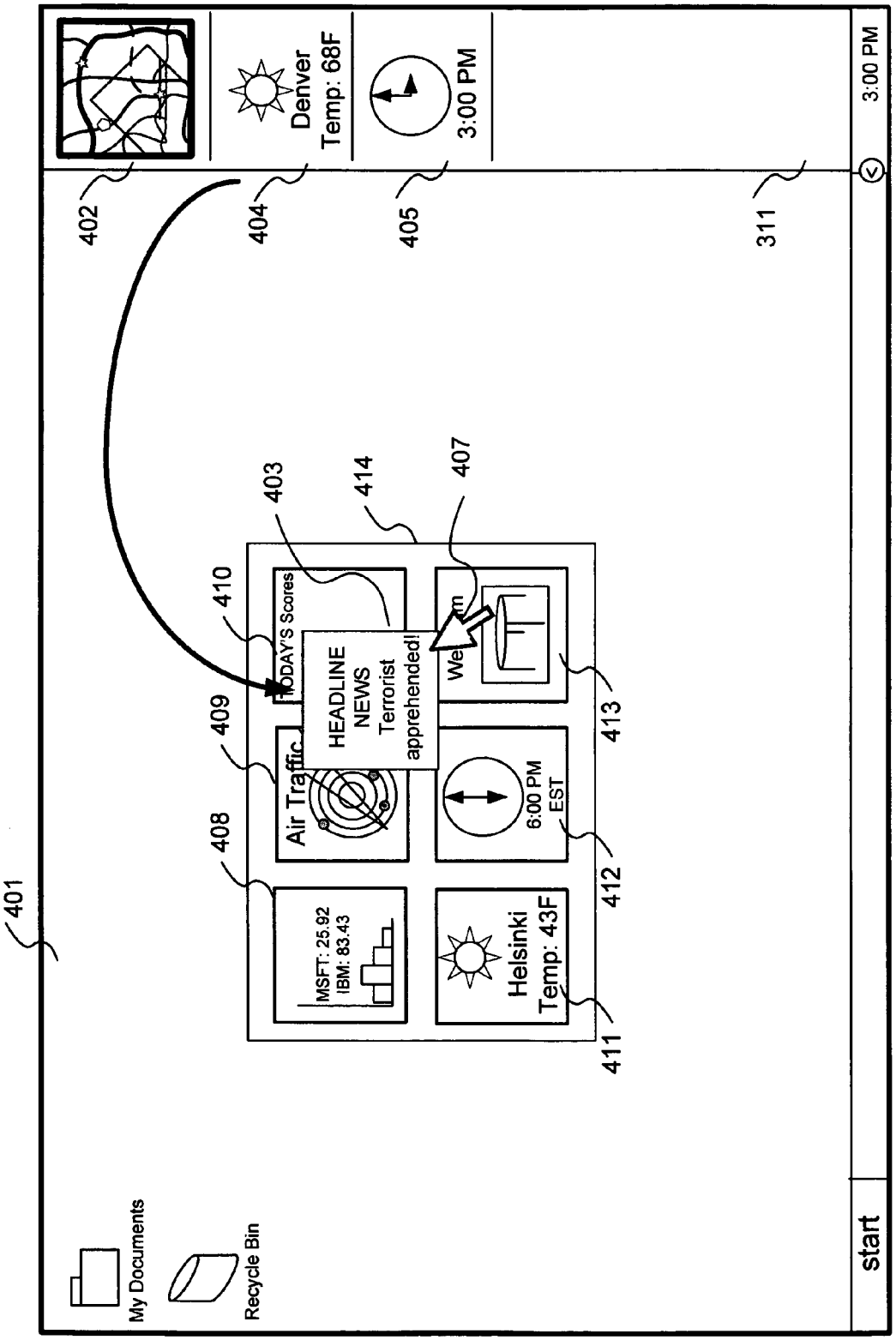

Parts may be removed or undocked from the sidebar docking area 311 as illustrated in the example of FIG. 4B. In this example, the news part 403 is selected to be undocked from the sidebar docking area 311. Selection of the news part 403 may be accomplished in a variety of ways. In this example, selection of the news part 403 is accomplished by clicking on the news part 403 and dragging with the cursor 407. FIG. 4C illustrates moving the news part 403 from the sidebar docking area 311 to the part picker 414 (i.e., dragging and dropping the news part 403). The sidebar docking area 311 may rearrange the parts remaining in the sidebar docking area 311 after another part is undocked so that the parts are evenly spaced. As seen in the example of FIG. 4C, the traffic part 402, weather part 404 and time part 405 are rearranged after the news part 403 is undocked.

Figure 5:
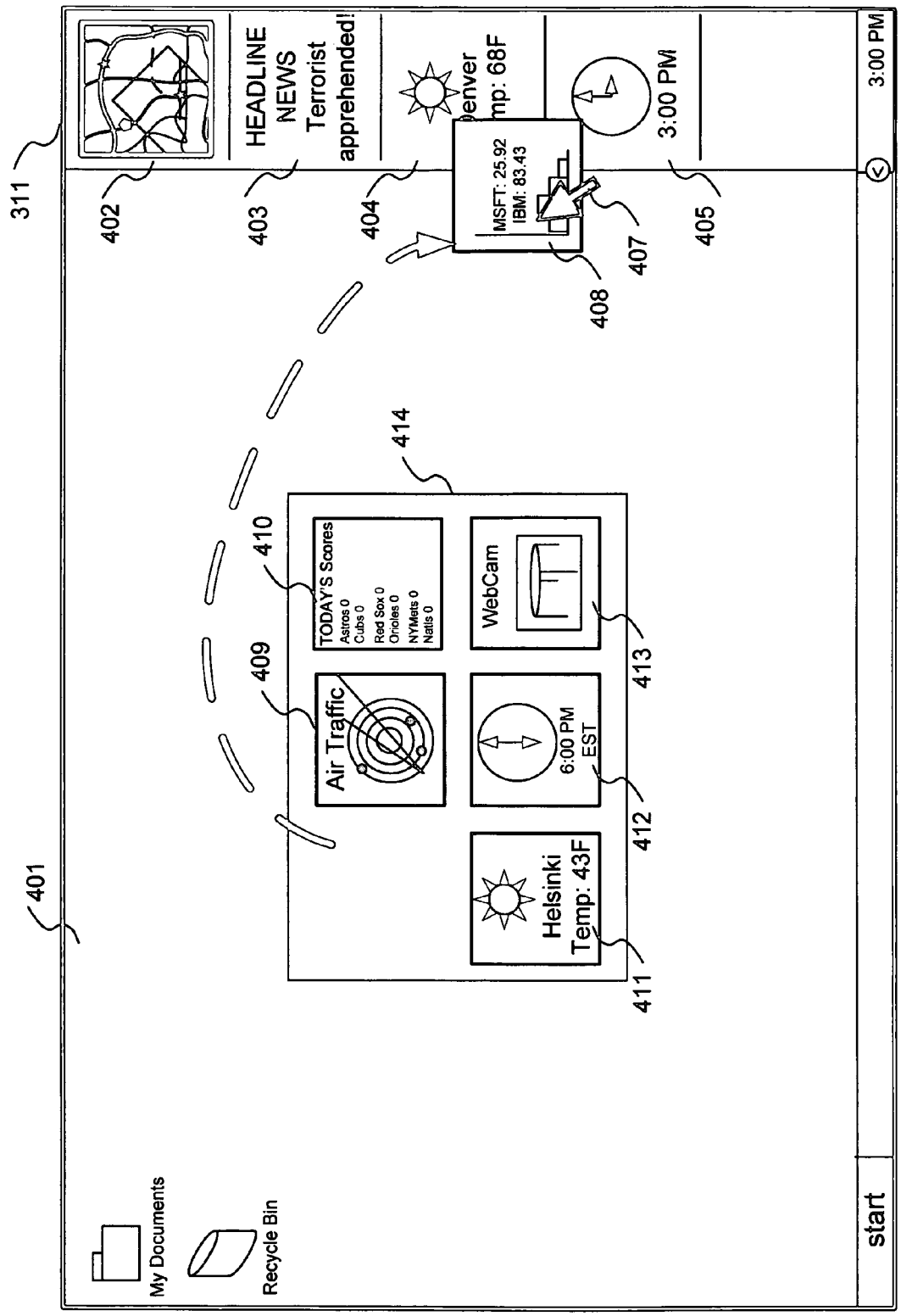
FIGS. 5 and 6 illustrate an example of selecting a part from a part picker and docking the selected part to a sidebar.
Figure 6:
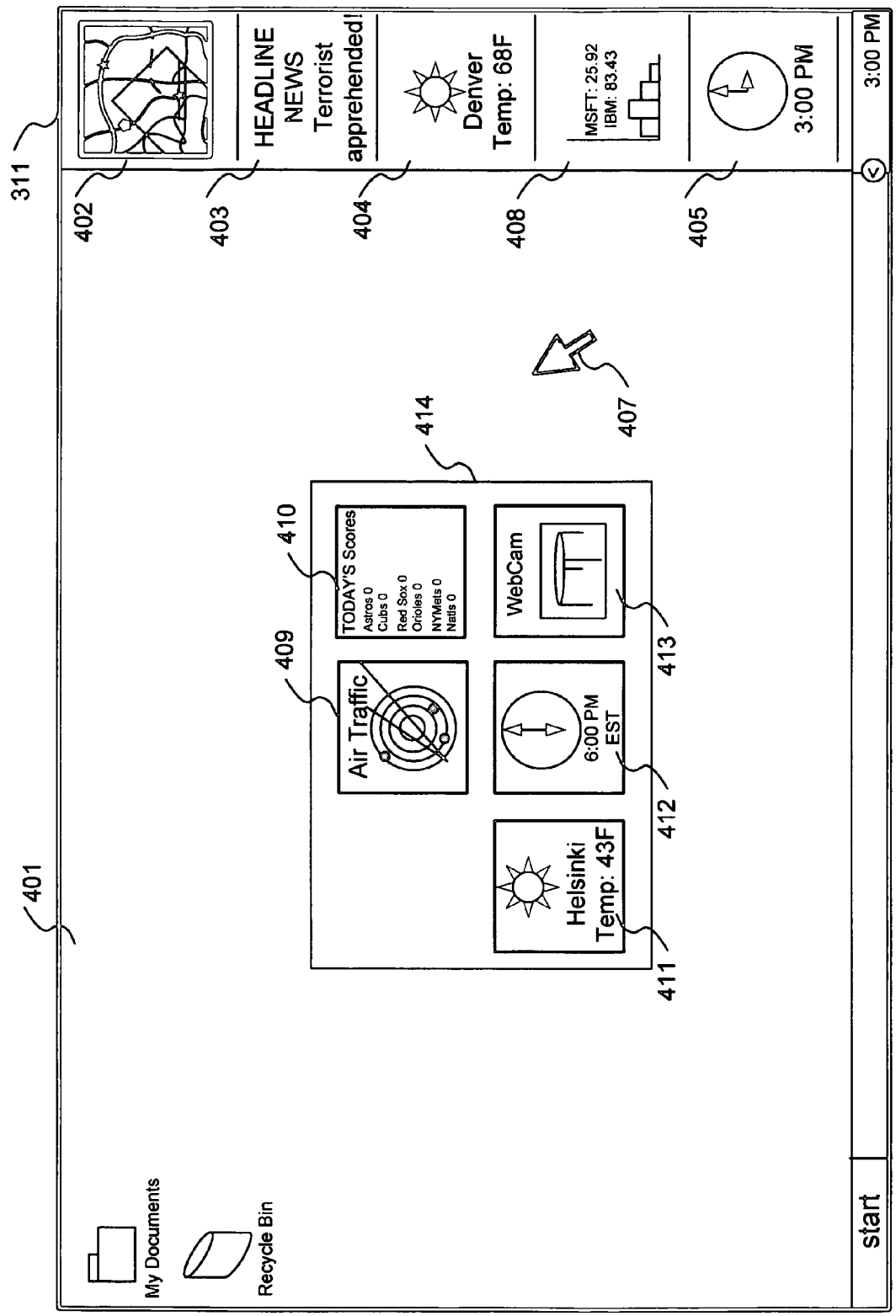

Parts may also be added to the sidebar (i.e., docked onto the sidebar) from the part picker. FIG. 5 illustrates an example of docking a part onto a sidebar. In this example, the stock quote part 408 is selected to be docked onto the sidebar docking area 311. The cursor 407 is used to select the stock quote part 408 and the stock quote part 408 is dragged to the sidebar docking area 311. When the part 408 overlaps the sidebar docking area 311, the part 408 may be docked onto the sidebar docking area 311. As seen in FIG. 6, the stock quote part 408 has been docked into the sidebar docking area 311. The parts that are already docked on the sidebar docking area 311 can be rearranged to accommodate the incoming part 408. FIG. 6 illustrates the traffic part 402, news part 403, weather part 404 and time part 405 rearranging to make space for the stock quote part 408 as the stock quote part 408 is docked onto the sidebar docking area 311.

Figure 7:
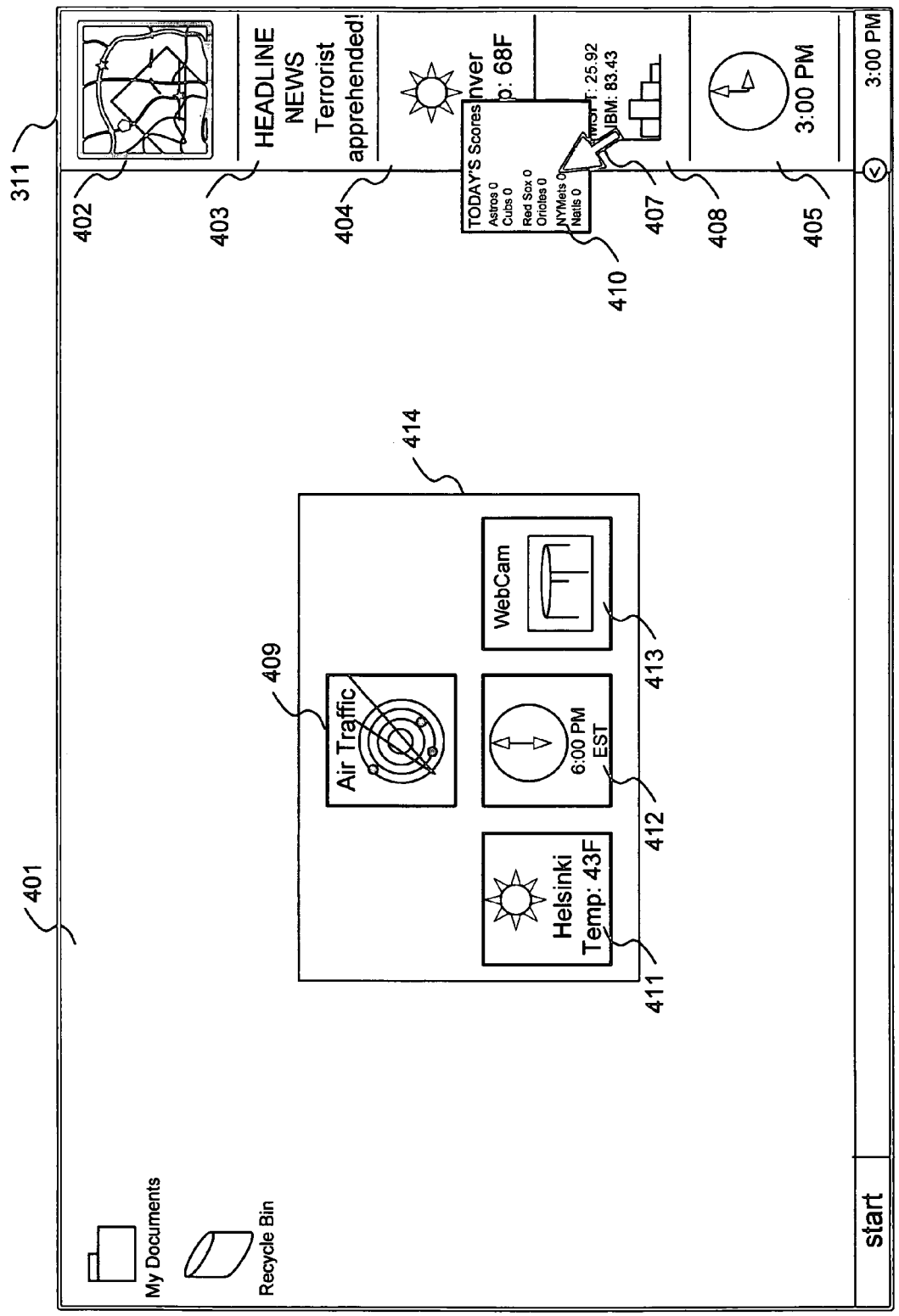
FIG. 7 illustrates another example of docking a part on a sidebar.

In FIG. 7, another part 410 is added (i.e., docked) to the sidebar docking area 311. However, in this example, the sidebar docking area 311 appears to contain a maximum number of parts as there is insufficient free space on the sidebar docking area 311 to display all of the parts. Specifically, in this example, the traffic part 402, news part 403, weather part 404, stock quote part 408 and time part 405 all take up the entire sidebar docking area 311 as a sports scores part 410 is dragged onto the sidebar docking area 311. The sidebar docking area 311 can be adjusted to accommodate additional parts in a variety of ways. FIGS. 8A-8D illustrate examples of accommodating additional parts but are not limited to the illustrated embodiments. Many additional methods for accommodating additional parts may also be used.

FIG. 8A illustrates one example of docking of a part in a sidebar with other docked parts. In this example, the incoming part (in this example, the stock quote part 410) is docked onto the sidebar and another part is automatically undocked from the sidebar. The undocked part (in this example, the time part 405) may be returned to the part picker 414 (not shown) or may be transferred to any desired location. For example, the undocked part may be sent to the desktop. The part that becomes undocked may be determined by a variety of methods. In one example, the part that is at the bottom of the displayed sidebar docking area 311 is undocked from the sidebar docking area 311. In another example, the least referenced part can be undocked from the sidebar docking area 311. In yet another example, the last part docked onto the sidebar is the part that is undocked. In still another example, the user may select which part to undock through, for example, a dialog box or warning box.

FIG. 8B illustrates another example of managing excess parts on a sidebar. In this example the incoming part (e.g., the sports scores part 410) is docked onto the sidebar docking area 311 at the location where the part was dragged. Because docking of the sports scores part 410 results in overcrowding on the sidebar docking area 311. An excess part is removed from the visible display but not undocked from the sidebar in this example. Rather, the non-visible part is still docked to the sidebar but merely not visible on the display. To view the excess part(s) not visible on the display, a scroll bar 801 may be provided such that a user can scroll up or down to view any desired part that is docked to the sidebar. Other known scrolling UI's may also or alternatively be used.

FIG. 8C illustrates another example of managing excess parts on a sidebar. As in the previous example, the sports scores part 410 is docked onto the sidebar docking area 311 but results in overcrowding on the sidebar docking area 311. In this example, the excess part is removed from the visible display but left docked to the sidebar docking area 311. However, to view the excess part(s) not visible on the display, the parts on the sidebar docking area 311 may be scrolled side to side. In the example of FIG. 8C, a scroll bar 820 (or any scrolling UI) may be provided such that a user can scroll side to side to view any desired part that is docked to the sidebar.

FIG. 8D illustrates another example of managing an overflow of parts on a sidebar. In this example, the sports scores part 410 is docked to the sidebar docking area 311. Since this results in insufficient space in the sidebar docking area 311 to display all parts, an extra part is not displayed on the display. Rather, the extra part remains docked in the sidebar docking area 311 but is in a saved part location that is not visible on the display. In this example, an overflow indicator 802 is displayed in the sidebar docking area 311. When the overflow indicator 802 is selected (e.g., with the cursor 407), any of the parts in overflow (in this example, the time part 405) can be displayed.

Figure 9B:
FIGS. 9A-9B illustrate an example of minimizing a sidebar.
Figure 9A:
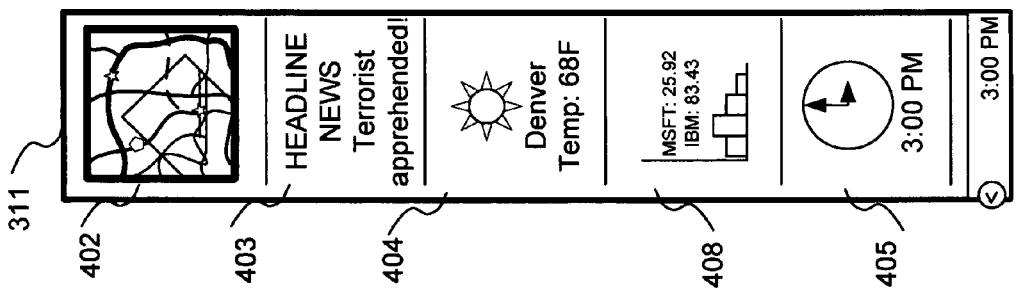

In another example, a sidebar can be minimized, for example, when extra space is required on the display. FIG. 9A illustrates a sidebar docking area 311 in which five parts are docked (traffic part 402, news part 403, weather part 404, stock quote part 408, and time part 405). FIG. 9B illustrates the sidebar docking area 311 of FIG. 9A after the sidebar docking area 311 has been minimized. The location where the sidebar docking area 311 was situated prior to minimization is indicated by the dotted line. In this example, an icon 901 can be used in the system tray for opening the sidebar again on the display. Selection of the icon 901 can cause the sidebar docking area 311 to reappear on the display with the docked parts.

A sidebar docking area 311 may be exploded or imploded with corresponding changes in the display of the parts docked on the sidebar docking area 311. A sidebar docking area 311 and corresponding parts can be "exploded" when the sidebar docking area 311 is removed from the display. Upon exploding of the sidebar docking area 311, the parts that are docked to the sidebar docking area 311 can be displayed in an alternate location, in another application, or on the desktop. Exploding of the sidebar docking area 311 may involve the removal of the display of the sidebar docking area 311. Examples include minimizing the sidebar docking area (as illustrated in FIGS. 9A and 9B) or quitting the sidebar application.

Figure 10:
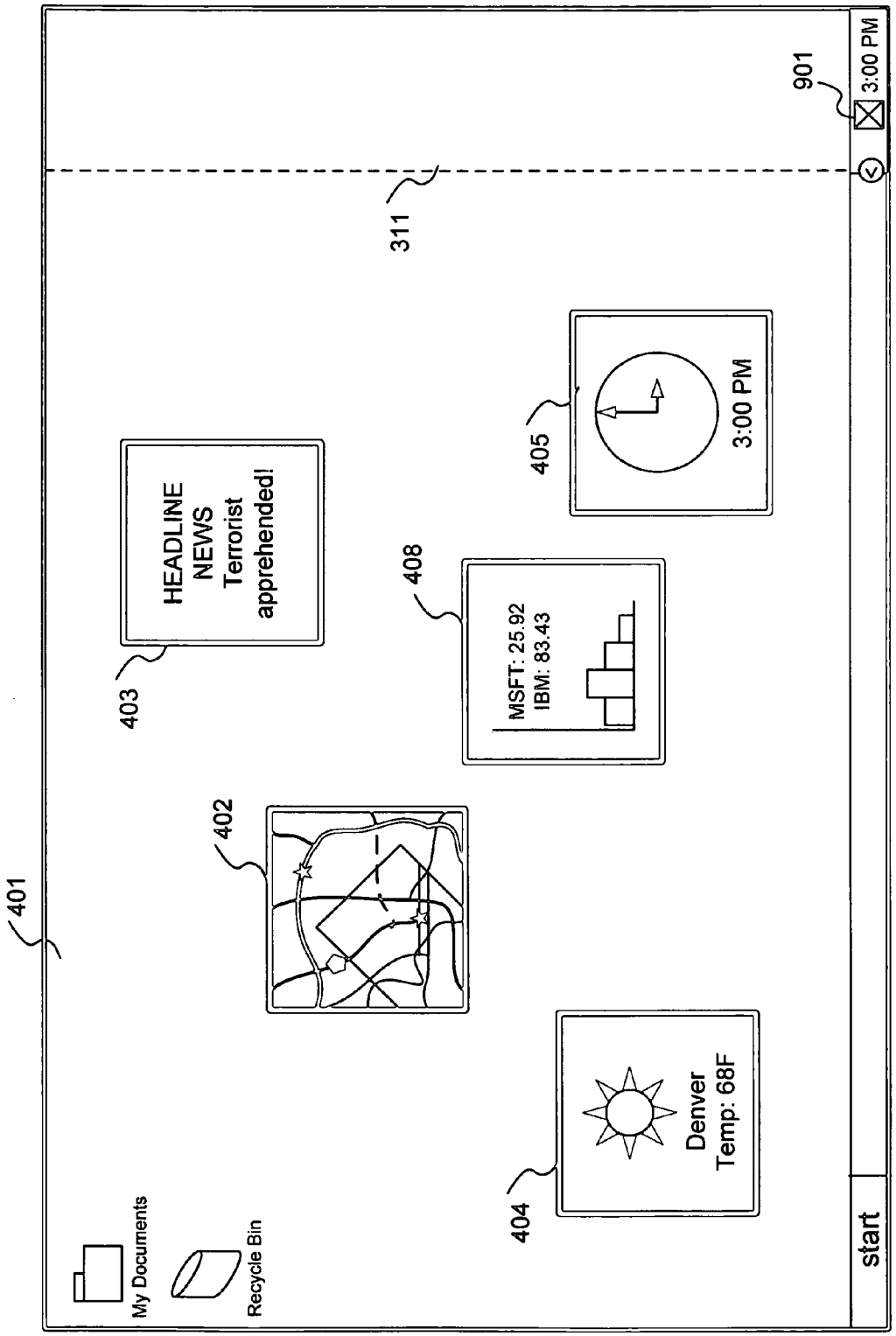
FIG. 10 illustrates a computer desktop containing parts and a minimized sidebar.

Hence in this example, after exploding (e.g., minimizing or closing) the sidebar docking area 311, the parts that are docked in the sidebar docking area 311 may also be removed from the display. In another example, the parts that are docked in the sidebar docking area 311 are not removed (i.e., "exploded") but rather, the parts are "released" onto the desktop or other desired location on the display so that the parts are displayed on the desktop or other desired location in a seemingly random pattern, or at each port's pre-docked location on the desktop. FIG. 10 illustrates an example of a sidebar docking area 311 having been removed from the display (e.g., minimized). An icon 901 appears in the system tray such that selection of the icon 901 causes the reappearance of the sidebar docking area 311 on the display. However, in this example, while the sidebar docking area 311 has been removed from the display (e.g., minimized), the parts that were docked in the sidebar docking area 311 are still displayed on the display 401. In this example, the traffic part 402, news part 403, weather part 404, time part 405 and the stock quote part 408 are displayed on the display 401 in a random configuration. The parts may alternatively be displayed in a configuration that is predetermined or selected by the user.

A sidebar docking area 311 may also be "imploded" by restoring the display of the sidebar docking area 311 on a display. Restoration of the display of the sidebar docking area can be accomplished in a variety of ways. If the sidebar docking area 311 was minimized when "exploded," the sidebar docking area 311 may be maximized (or otherwise opened) back to the display. If the sidebar docking area 311 was closed, then the sidebar docking area 311 may be re-launched to restore the display of the sidebar docking area 311 on the display. In restoring the sidebar docking area 311, an icon 901 may be selected to cause the sidebar docking area 311 to be displayed again. The parts associated with the sidebar docking area 311 can be displayed as docked onto the sidebar docking area 311 again. The order of the parts in the sidebar docking area 311 after the display of the sidebar 206 is returned to the display may be random within the sidebar docking area 311 or may be predetermined. The order of the parts may also be the same as the order prior to minimizing the sidebar 206, if desired.

Included at the end of this detailed description is an Appendix describing examples of functions, notifications, messages and data structures in a data file for representing a user interface corresponding to a program or part. For example, the data structures of the Appendix may be embodied in the PartML file 302 as described. Because the Appendix will be readily understood by persons skilled in the art, it will not be extensively discussed herein. As can be seen in the appendix, however, various other messages or data structures can be used as part of a process similar to the examples of FIGS. 4A-4C, FIGS. 5-7, FIGS. 8A-8C, FIGS. 9A-9C, and FIG. 10.

It is understood that aspects can take many forms and embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

APPENDIX

Part Object

Events
  Activate( )
  Closed( )
  Deactivate( )
  Dock—//OnDock
  DragBegin( )
  DragEnd( )
  ExitOverflow( )
  Hide( )
  Loaded( )
  ScreenChanged
  Show( )
  ShowSettings
  Undock
  AddTimer((string) TimerName, (Function Pointer) Function)
  RemoveTimer((String) TimerName)
  Sleep((Int)Milliseconds)
  Properties
  ActiveWindow—r/o. (Boolean)
  Docked—r/w. (Boolean) If the part is on the sidebar or not.
  IsInOverflow—r/o. (Boolean)
  ProcessGroup—r/o. (String) Name of group.
  Settings—r/o. (Settings Object)
  View—r/o. (Object—Element or ActiveX)
  Title—r/o. (String) Name from manifest file.
  Id—r/o. Sidebar-generated Unique Id for this part instance.
  WidgetMenuButtonOffsetTop—r/w. (Int) Pixel offset of the menu
  WidgetMenuButtonOffsetRight—r/w. (Int) Pixel offset of the menu
  Hotkey
  LogEvents—r/w. (Boolean)
  Shown—r/o. Describes if any portion of the part is visible. (Boolean)
  Visibility—r/w. Does the part have a visible window. (Boolean)
  Part.Settings Object
  Read((String)PropertyName)
  IWrite((String)PropertyName, (String)PropertyValue)
  Part.Animation Object
  Methods
  See Element for others Animations
  Part.View Object
  Collections
  Children (Elements)
  Methods
  StopUpdates
  StartUpdates
  CreateElement((String)ElementType)
  LoadResource((String)NamedResource) (Element)//
    Named resources of types View, Strings
  Properties
  VisualsUpdating
  Part.ViewElements Object System Object
  System.Diagnostics.EventLog Object
  Methods
  WriteEntry((String)EventDescription)—assumes Information Type
  WriteEntry((String) EventDescription, (Int) EventLog EntryType)
    1—Error
    2—Warning
    4—Information
    8—SuccessAudit
    16—FailureAudit
  System.Display Object
  Collection
  Monitors (System.Display.Screen)
  Events
  PrimaryScreenChanged( )//no args ScreenChanged( )//no args
TerminalServerChanged//no args
Properties
IsDragFullWindows—r/o. (Boolean)
IsHighContrast—r/o. (Boolean)
IsDropShadowEnabled—r/o. (Boolean)
IsTerminalServerSession—r/o. (Boolean)
PrimaryScreen—r/o. (System.Display.Screen)
System.Display.Screen Object
Methods
GetBounds( )—(String) int,int//width,height of current screen
GetWorkingArea( )—(String) int,int//width,height of available space (non-taskbar)
Properties
Height—r/o. (Int) Pixels for current Display
Left—r/o. (Int) Pixels for current Display
Top—r/o. (Int) Pixels for current Display
Width—r/o. (Int) Pixels for current Display
WorkingHeight—r/o. (Int) Pixels for current Display
WorkingLeft—r/o. (Int) Pixels for current Display
WorkingTop—r/o. (Int) Pixels for current Display
WorkingWidth—r/o. (Int) Pixels for current Display
DPI—r/o. (Int) Pixels per inch for full display
BitsPerPixel—(Int)//colors per pixel; 2,4,8,etc
Resolution—r/o. (String) 1200×800//current dimensions
DeviceName—(String)
PrimaryScreen—(String)//name of primary monitor
System.Environment Object
Properties
DialogFont
ShellFont
WindowTitleColor
WindowBackgroundColor
WindowFontColor
UserDomainName
UserName
MachineName
GetEnvironmentVariable
GetSystemetrics Properties
SystemParameterInfo Properties
System.Globallization Object
Methods
FormatNumber((Float/String) Number)
FormatDate((String) Format), Date)//ShortDate, Long-Date
FormatTime((String) Format), Time)//ShortTime, Long-Time
Properties
CurrentCulture—r/o. (String)//en-us
DisplayName—r/o. (String)//English (U.S.)
IetfLanguageTag—r/o. (String)//de-DE
LCID—r/o. (Int)//1033
Name—r/o. (String) "EnglishUS"
ThreeLetterISOLanguageName—r/o. (String)//eng
TwoLetterISOLanguageName—r/o. (String)//eng
System.IO.BinaryReader
System.IO.BinsaryWriter
System.Machine Object
Collections
Processors (System.Machine.ProcessorInfo)//Returns 1 processor per core
Properties
CPUCount—r/o. (Int)
TotalCPUUsage—r/o. (Float) [0 . . . 1]
TotalMemory—r/o. (Int)
System.Machine.Processor Object
Properties
Load—r/o. (float [0 . . . 1])
ProcessorId—r/o. (String)
Stopped—r/o. (Boolean)
System.Net Object
System.New Mail Object
System.Net.Mail.Smtp Object
System.Net.NetworkInformation Object
   Collections
   NetworkInterfaceType (System. Net. NetworkInterface)
   Events
   NetworkAddressChanged( )//no event args
   NetworkAvailabilityChanged//Fired when one of the networks changes Address
System.Net.Dns Object
   Methods
      GetHostName—r/o. (String) mycomputer.example.com
System.Net.NetworkInformation.IPAddressInformation Object
   Properties
   Address—r/o. (String) 127.0.0.1
   IsTransient—r/o. (Boolean) Will this address change periodically
System.Net.IPInterface Object
   Collections
   DnsAddresses (collection)
   Properties
   PrimaryDnsAddress—r/o. (String)—r/o. (Boolean)
System.Net.NetworkInterface Object
   Properties
   SignalStrength—(Int) [0 . . . 100]
   SSID—r/o. (String) Name of wireless network
   NetworkType—r/ow (String) Name of network type
System.Net.Soap Object
System.PowerStatus Object
Properties
BatteryChargeStatus—r/o. (Int)
   1—High
   2—Low
   4—Critical
   8—Charging
   128—NoSystemBattery
   255—Unknown
BatteryLifeFull—r/o. Approx. seconds available on fully charged battery. −1 if unknown. (Int)
BatteryLifePercent—r/o. 0-100, 255 unknown.
BatteryLifeRemaining—r/o. Approx. seconds remaining. −1 if unknown. (Int)
PowerLineStatus—r/o. AC Status (Int)
   0—Offline
   1—Online
   255—Unknown
System.Sounnd Object
Methods
Beep
PlaySound((String)FileSystemItem)
Properties
MasterVolume—r/w. The volume of the computer. (Float [0 . . . 1])
Mute—r/w. The mute status of the computer. (Boolean)
System.Shell Object
   Collections
   Directories (String)
   Files (String)
   FileSystemEntires (String) Directories+Files Drives (System.Shell.Drive)—logical drives, <drive letter>:\
Event
DirectoryChanged((String)Path, (Function Pointer)Function)
Methods
(System.Shell.Item) ChooseFile((String)Path, (String)Filter)
(System.Shell.Item) ChooseFolder((String)Path) (String, RGB) ColorPicker( )
CreateDirectory((String)Path)
Delete((String)Path)—Deletes an empty directory
Delete((String)Path, (Boolean)Recursively)—Deletes directory and all children
Execute((String)Command)
ExecuteVerb((String)Command, (String)Verb)
Exists((String)Path)
   (Boolean) Exists((String)Path)
FriendlyName
(String) GetCurrentDirectory( )
(String) GetDirectoryRoot((String)Path)
(System.Shell.Item) GetItem((String)Path)
(String) GetParent((String)Path)—Absolute path.
   (String)Path KnownFolder((String)FolderName)
      Desktop—The user's desktop folder
      Startup—The user's startup folder
      StartMenu—The user's Start Menu folder
      Documents—The user's Documents folder
      CommonStartup—The system's start menu startup group
      CommonPrograms—The system's start menu programs group
      CommonDesktop—The system's desktop folder
      CommonFavorites—The system's favorites folder
      CommonDocuments—The system's documents folder
      System—The system's "System" folder
      SystemX86—The system's 32 bit "system" folder on 64 bit windows
      Profile—The user's Profile folder
      Windows—The system's Windows folder
      Pictures—The user's Pictures folder
      Music—The user's Music folder
      Videos—The user's Videos folder
      ProgramFiles—The system's Program files folder
      ProgramFilesCommon—The system's Program files common folder
      ProgramFilesX86—The system's 32 bit Program files folder on 64 bit windows
      AdminTools—The user's Admin tools folder
      CommonAdminTools—The system's admin tools folder
      CommonMusic—The system's music folder
      CommonPictures—The system's pictures folder
      CommonVideos—The system's videos folder
      UserProfiles—The system's user profiles folder
      Downloads—The user's Downloads folder
      CommonDownloads—The system's Program files folder
      Application Data
      Parts
      Temporary
      RecycleBin
Move((String)SourcePath, (String)DestinationPath)
Name
Navigate((String)Url)
(System.Shell.Item) SaveFileDialog((String)Path, (String)Filter)
System.Shell.Drive Object
Methods
EmptyRecycleBin
Properties
DriveFormat—r/o. Name of the file system. (String)
DriveLetter—r/o. (String)
DriveType—r/o. (Int)
   0—Unknown
   1—NoRootDirectory
   2—Removable
   3—Fixed
   4—Network
   5—CDRom
   6—RAM
FreeSpace
IsReady—r/o. (Boolean)
Name—r/o. Drive name. (String)
RootDirectory—r/o. Directory for the drive. (String→DirectoryInfo)
TotalFreeSpace—r/o. (Long)
TotalSize—r/o. (Long)
VolumeLabel—r/w. (String)
System.Shell.RecycleBin Object
Methods
Empty( )
Properties
FreeSpace—r/o. (Int)//Kb of free space
ItemsCount—r/o. (Int)
DisplayDeleteDialog—r/w. (Boolean)
Enabled—r/w. Preserves files for later recovery. (Boolean)
PrecentFull—r/o. (Float [0 . . . 1])
ReservedPercent—r/w. (Float [0 . . . 1])
SizeUsed—r/o. Kb usage (Int)
UseOneSettingForAllDrives—r/o. (Boolean)
System.Shell.Crive.RecycleBin Object
Methods
Empty( )
Properties
FreeSpace
ItemsCount—r/o. (Int)
DisplayDeleteDialog—r/w. (Boolean)
Enabled—r/w. Preserves files for later recovery. (Boolean)
PrecentFull—r/o. (Float [0 . . . 1])
ReservedPercent—r/w. (Float [0 . . . 1])
SizeUsed—r/o. Kb usage (Int)
System.Shell.Item Object
Collections
Metadata (System.Shell.Item.Metadata)
Methods
Copy((String)DestinationPath)
CreateText((String)Path)
Delete((String)Path)
MoveToRecycleBin((String)Path)
Show((String) Path)
Metadata((String)MetadataType)
InvokeVerb((String)Verb)
(Int) GetAttributes((String)Path)
   1—ReadOnly
   2—Hidden
   4—System
   16—Directory
   32—Archive
   64—Device 128—Normal
256—Temporary
512—SparseFile
1024—ReparsePoint
2048—Compressed
4096—Offline8192—NotContentIndexed
16384—Encrypted
GetCreationTime((String)Path)
Move((String)Path)
Properties
Folder—r/o. (String)
IsLink—r/o. (Boolean)
ItemType—r/o. Returns a known file type (String)
   Audio
   Video
   Picture
   Directory
Link—r/o. (String)
ModifyDate—r/w. (String)
Name—r/w. (String)
Path—r/o. (String)
Size—r/o. (Int)
Type—r/o. (String)
RealShellItem((String)Path)
System.Shell.Item.Metadata Object
Properties
Name—r/o. Name of the parsed metadata. (String)
Value—r/o. Value of the parsed metadata. (String)
System.Shell.RecycleBin Object
Methods
EmptyAll
ShowRecycleSettings—r/o.
Properties
FileCount—r/o. (Int)
FolderCount—r/o. (Int)
DisplayDeleteDialog—r/w. (Boolean)
Enabled—r/w. Preserves files for later recovery. (Boolean)
OneSettingForAllDrives—r/w. (Boolean)
PrecentFull—r/o. (Float [0 . . . 1])
ReservedPercent—r/w. (Float [0 . . . 1])
SizeUsed—r/o. Kb usage (Int)
System.Timezone Ojbect
Methods
(String) GetUtcOffset((String)LocalDateTime)
(Boolean) IsDaylightSavingsTime((String)UtcDateTime)
(String) ToLocalTime((String)UtcDateTime)
(String) ToUniversalTime((String)LocalDateTime)
Properties
CurrentTimeZone—r/o. (String)
DaylightName—r/o. (String)
StandardName—r/o. (String)
System.Web.HttpUtilObject
Methods
(String) UrlPathEncode((String)Url)
System.XML Object
Http Object
  (HttpRequest)
DOM Object
  (MsXml)
PowerModeChangedEvent Object
SystemEvents Object
Events
DisplaySettingsChanged
LowMemory
PaletteChanged
PowerModeChanged
//to System.Environment TimeChanged
TimerElapsed
UserPreferenceChanged
UserPreferenceChanging
Event Object
  Properties
  ClickCount—r/o. (Int)
  MouseWheelDelta—r/o. (Int)
  Handled—r/w. (Boolean)
  IsKeyDown—r/o. (Boolean)
  Key—r/o. (String)
  KeyState
  None—0
  Down—1
  Toggled—2
  ModifierKeys—r/o. (String)
  None—0
  Alt—1
  Control—2
  Shift—4
  Windows—8
  AltGr
  MouseKeyStates—r/o.
  None—0
  LeftMouseButton—1
  RightMouseButton—2
  ShiftKey—4
  ControlKey—8
  MiddleMouseButton—16
  AltKey—32
  Source—r/o.
Element Object
  Collections
  Children (Element)
  Events
  DragEnter
  DragLeave
  Drop
  GotFocus
  KeyDown
  KeyUp
  LostFocus
  MouseEnter
  MouseLeave
  MouseLeftButtonDown
  MouseLeftButtonUp
  MouseMove
  MouseRightButtonDown
  MouseRightButtonUp
  MouseWheel
  //to specific elements TextInput
  Methods
  ShowDialog((String)Message, (String)Title, (String)Type, (Int)Buttons) to part
  CreateElement((String)ElementType) to part
  (Element) FindChild((String)ElementName)
  (Collection(Elements)) FindChildren((String)ElementName)
  Insert((Element)Element)
  Insert((Int)Index, (Element)Element)
  Remove((Element)Element)
  RemoveAt((Int)Index)
  Slide((Element)Name)
  FadeIn((Element)Name)
  FadeOut (Element)Name)
  Properties
  Background—r/w. (RGBA) (String)

//Different than TabStop—CanAcceptKeyboardFocus
Canvas.Bottom—r/w. (Int)
Canvas.Left—r/w. (Int)
Canvas.Right—r/w. (Int)
Canvas.Top—r/w. (Int)
CenterX—r/w. (Int)
CenterY—r/w. (Int)
Cursor—r/w. (String)
Arrow
Cross
Hand
Height—r/w. (Int)
IsTabStop—r/w. (Boolean)
Name—r/w. (String)
Opacity—r/w. (Int) (0 clear . . . 1 opaque)
Parent—r/w. (Element)
Rotate
TabIndex—r/w. (Int)
Tag—r/o. (String)
Tooltip—r/w. (String)
Visibility—r/w.
Visible (0)
Hidden (1) Not shown, occupies layout
Collapsed (2) Not shown, no layout
Width—r/w. (Int)
ZOrder
Element.Drawing Object
Element.ActiveXControl Object
Collections
AmbientProperties
Events
Properties
Control—r/o. (Object)
　　ObjectId—r/w. (String)
DisplayAsDefault always false
DisplayName unknown
ForeColor White, or whatever default for a part is
BackColor Black, or part default
Font SeguoeUI, or part default
TextAlign Left
LocaleID LCID for current fallback language
Palette BitDepth
UserMode True
Element.Canvas
Inherits From Element
Button Object
Inherits From Element
Events
Click
Properties
RestingState—r/w. Url for image (String)
HotState
Pressed State
9GridState
Color—r/w. RGB Value (String)
IsDefault—r/w. (Boolean)
IsEnabled—r/w. (Boolean)
IsPressed—r/o. (Boolean)
FontFamily—r/w. (String)
FontSize—r/w. (Int)
FontStyle—r/w. (String)
FontWeight—r/w. (String)
HorizontalAlignment—r/w. (String)
TextWrap—r/w. (Boolean)
VerticalAlignment—r/w. (String)
Checkbox Object
Inherits From Element
Collections
Children (Element)
Events
CheckStateChanged
Click
Properties
CheckState
　　0—Unchecked
　　1—Checked
　　2—Indeterminate
IsChecked—r/w. (Boolean)
IsEnabled—r/w. (Boolean)
ThreeState—r/w. (Boolean)
ColorPicker Object
Inherits From Element
Properties
SelectedColor—r/w. (String)
ShowColorPickerDialog
ComboBox Object
Inherits From Element
Collection
Items (String)
Events
SelectionChanged
Properties
AutoComplete—r/w. (Boolean)
Color—r/w. RGB Value (String)
FontFamily—r/w. (String)
FontSize—r/w. (Int)
FontStyle—r/w. (String)
FontWeight—r/w. (String)
IsEditable—r/w. (Boolean)
IsEnabled—r/w. (Boolean)
IsReadOnly—r/w. (Boolean)
MaxDropDownHeight—r/w. (Int)
SelectedIndex—r/w. First selected item. −1 if none selected. (Int)
Text—r/w. (String)
DatePicker Object
Inherits From Element
Properties
SelectedDate—r/w. (String)
FontPicker Object
Inherits From Element
Properties
SelectedFont—r/w. (String)
Hyperlink Object
Inherits From Element
Properties
ImageUrl—r/w. (String)
NavigateUrl—r/w. (String)
Text—r/w. (String)
Image Object
Inherits From Element
Methods
SizeToContent( )
Properties
Description—r/w. (String)
HorizontalAlignment—r/w. (String)
Source—r/w. Url of the image (String)
Stretch—r/w. (Int)
　　0—None; Preserve original size
　　1—Fill; Resize. Don't preserve aspect
　　2—Uniform; Resize, preserve aspect
　　3—UniformToFill; Fill, preserve aspect and clip.

StretchDirection
    0—UpOnly. Make larger, not smaller
    1—DownOnly. Make smaller, not larger
    2—Both. Always resize to size according to Stretch
VerticalAlignment—r/w. (String)
Ink Object
Inherits From Element
Properties
InkImage
InkStrokes
ListBox Object
Inherits From Element
Collection
Items—r/w. (String)
SelectedIndicies—r/w. (Int)
Events
SelectionChanged
Properties
Color—r/w. RGB Value (String)
IsEditable—r/w. (Boolean)
IsEnabled—r/w. (Boolean)
IsReadOnly—r/w. (Boolean)
SelectedIndex—r/w. First selected item. −1 if none selected. (Int)
SelectionMode—r/w. (String)
    Single—one
    Multiple—more than one
    Extended—Groups, via Shift key
MaxDropDownHeight—r/w. (Int)
Text—r/w. (String)
TextWrap—r/w. (Boolean)
Password Object
Inherits From Element
Properties
Color—r/w. RGB Value (String)
FontFamily—r/w. (String)
FontSize—r/w. (Int)
FontStyle—r/w. (String)
FontWeight—r/w. (String)
HorizontalAlignment—r/w. (String)
IsEnabled—r/w. (Boolean)
MaxLength—r/w. (Int)
Password—r/w. (String)
PasswordChar—r/w (Char)
TextWrap—r/w. (Boolean)
VerticalAlignment—r/w. (String)
Popup Object
Inherits From Element
Events
Closed
Opened
Properties
DesktopX—r/w. (Int)
DesktopY—r/w. (Int)
HorizontalOffset
Placement
    Bottom
    Center
    Right
Placement
SizeToContent—r/w. (Boolean)
VerticalOffset
RadioButtonList Object
Inherits From Element
Events
SelectionChanged
Properties
IsEnabled—r/w. (Boolean)
RadioButton Object
Inherits From Element
Events
Click
Properties
Color—r/w. RGB Value (String)
FontFamily—r/w. (String)
FontSize—r/w. (Int)
FontStyle—r/w. (String)
FontWeight—r/w. (String)
IsEnabled—r/w. (Boolean)
IsSelected—r/w. (Boolean)
RichText Object
Inherits From Element
Properties
RtfData
Text
ScrollBar Object
Inherits From Element
Collections
Children
Properties
IsEnabled—r/w. (Boolean)
SearchBox Object
Inherits From Element
Collections
SearchItems (String)
Properties
IsEnabled—r/w. (Boolean)
Text—r/w. (String)
TextBlock Object
Inherits From Element
Properties
Color—r/w. RGB Value (String)
FontFamily—r/w. (String)
FontSize—r/w. (Int)
FontStyle—r/w. (String)
FontWeight—r/w. (String)
HorizontalAlignment—r/w. (String)
IsEnabled—r/w. (Boolean)
Text—r/w. (String)
TextWrap—r/w. (Boolean)
VerticalAlignment—r/w. (String)
TextBox Object
Inherits From Element
Properties
AutoComplete—r/w. (Boolean)Color—r/w. RGB Value (String)
FontFamily—r/w. (String)
FontSize—r/w. (Int)
FontStyle—r/w. (String)
FontWeight—r/w. (String)
HorizontalAlignment—r/w. (String)
IsEnabled—r/w. (Boolean)
MaxLength—r/w. (Int)
Text—r/w. (String)
TextWrap—r/w. (Boolean)
VerticalAlignment—r/w. (String)
VideoPlayer Object
Inherits From Element
Properties
Source—r/w. Url for the video (String)

Items Object
  Properties
   Item—r/w. (String)
   Count—r/o. (Int)

We claim:

1. A computer system comprising:
   a memory storing computer readable instructions and data for use with a host user interface associated with a host application, said memory comprising:
     a definition data file defining an object model corresponding to a secondary user interface associated with a stand-alone gadget, said gadget providing real-time information via the secondary user interface, said secondary user interface being rendered within the host user interface;
     a script data file containing executable computer code defining actions corresponding to the secondary user interface;
     a loader component module passing the definition data file to a program parser module and passing the script data file to a script engine;
     the program parser module performing the steps of:
       a) creating the object model of the secondary user interface based on the definition data file;
       b) converting the object model to the secondary user interface for display; and
       c) passing the object model to the script engine module;
     a settings module, accessible to the script engine module, for customization of the secondary user interface;
     the script engine module performing the stops of:
       a) parsing the script data file;
       b) creating and executing a script based on the parsing of the script data file, accessible configuration settings, and received object model; and
       c) configuring the display of the secondary user interface based on the execution of the script.

2. The system of claim 1 further comprising a system object model containing procedures corresponding to the object model and information on characteristics of the object model.

3. The system of claim 2 wherein a plurality of instances of the gadget are rendered within the host user interface, said system further comprising a settings object model for storing, for each instance of the gadget rendered within the host user interface, the definition data file, the script file, and a manifest file of the gadget, said manifest file comprising gadget metadata and further comprising pointers to the definition data file and the script file of the gadget.

4. The system of claim 2 wherein the program parser module injects the system object model and the object model into the script engine.

5. The system of claim 4 wherein the script file is hooked up to the object model.

6. The system of claim 5 wherein the object model fires an event and execution of the script file accomplishes the event.

7. The system of claim 1 further comprising a user display comprising:
   the host user interface; and
   the secondary user interface rendered within the host user interface.

8. The system of claim 7 wherein the user display further comprises a third user interface corresponding to a part picker, the secondary user interface of the gadget being rendered within the third user interface.

9. The system of claim 8 wherein selection of the gadget via the third user interface causes the gadget to be rendered within the host user interface.

10. The system of claim 1 wherein the host user interface comprises a sidebar.

11. The system of claim 10 wherein the gadget is docked onto the sidebar.

12. The system of claim 1 wherein the computer-readable instructions further comprise a pointer file containing a pointer to the definition data file and to the script file.

13. A method for providing real-time information via a secondary user interface of a stand-alone gadget application within a host user interface of a host application, said host user interface being rendered on a display, said method comprising:
   providing a first pointer, the first pointer indicating a file path to a location of one of a file or a directory;
   searching the location indicated by the first pointer for a pointer file containing at least a second pointer indicating the location of at least one of a definition file and a script file, the definition file containing computer code defining an object model corresponding to the secondary user interface associated with the stand-alone gadget application, said gadget application providing real-time information via the secondary user interface, said secondary user interface being rendered within the host user interface, and the script file containing computer code defining actions corresponding to the secondary user interface;
   creating a representation of an object model corresponding to the definition file if the second pointer indicates the location of the definition file;
   providing real-time display of information via the secondary user interface, wherein providing the display comprises:
     providing a loader component module passing the definition file to a program parser module and passing the script data file to a script engine;
     the program parser module performing the steps of:
       a) creating the object model of the secondary user interface based on the definition file;
       b) converting the object model into the secondary user interface for display; and
       c) passing the object model to the script engine module;
     providing a settings module, accessible to the script engine module, for customization of the secondary user interface; and
     the script engine module performing the steps of:
       a) parsing the script data file;
       b) creating and executing a script based on the parsing of the script data file, accessible configuration settings, and received object model; and
       c) configuring the display of the secondary user interface based on the execution of the script.

14. The method of claim 13 wherein the second pointer indicates the location of the definition file.

15. The method of claim 14 wherein the pointer file further contains a third pointer indicating the location of the script file.

16. The method of claim 15 further comprising executing the script file to create an event corresponding to the secondary user interface.

17. The method of claim 13 further comprising hooking up the script file to the representation of the object model.

* * * * *

UNITED STATES PATENT AND TRADEMARK OFFICE
CERTIFICATE OF CORRECTION

PATENT NO. : 7,644,391 B2  Page 1 of 1
APPLICATION NO. : 11/206095
DATED : January 5, 2010
INVENTOR(S) : Fisher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1173 days.

Signed and Sealed this

Sixteenth Day of November, 2010

David J. Kappos
*Director of the United States Patent and Trademark Office*